UNITED STATES PATENT OFFICE.

EDWARD B. CRAFT AND JONATHAN W. HARRIS, OF HACKENSACK, NEW JERSEY, ASSIGNORS TO WESTERN ELECTRIC COMPANY, OF CHICAGO, ILLINOIS, A CORPORATION OF ILLINOIS.

ALLOY.

937,284.          Specification of Letters Patent.      Patented Oct. 19, 1909.

No Drawing.     Application filed February 24, 1909. Serial No. 479,798.

*To all whom it may concern:*

Be it known that we, EDWARD B. CRAFT and JONATHAN W. HARRIS, citizens of the United States, residing at Hackensack, in the county of Bergen and State of New Jersey, have invented a certain new and useful Improvement in Alloys, of which the following is a full, clear, concise, and exact description.

Our invention relates to an alloy for use in connection with electrical apparatus, and more particularly to an alloy which may be employed as a substitute for platinum in electrical contacts.

The object of our invention is to provide an alloy which is cheaper than platinum, and which nevertheless possesses the properties which render that metal valuable for use in connection with electrical appliances.

Our invention consists of an alloy of gold, silver and some metal, such as platinum, capable of imparting hardness to the alloy.

The silver is introduced in quantities sufficient to materially lessen the cost, without destroying the non-tarnishing property of pure gold, which latter metal constitutes the larger portion of the alloy. This mixture of gold and silver is so alloyed with sufficient quantities of the hardening metal, preferably platinum, to produce the degree of hardness required in material for electrical contacts. The alloy is composed of the above named constituents in about the following proportions: gold, 67½ to 70 per cent.; silver, 25 per cent.; platinum 5 to 7½ per cent.

The working requirements for contacts of electrical apparatus make it essential to restrict the component metals of the alloy of our invention rather closely to the proportions given above.

In order to make the alloy as cheap as possible, without detracting from the proper working qualities, we do not use any more gold than is necessary to overcome the tarnishing tendency of silver. We have found that we can safely use, as a maximum, 30 per cent. of silver, and still produce an alloy which will not corrode in service, and that we can use, as a minimum, 25 per cent. of silver without unduly increasing the cost of the alloy. As to the proportion of platinum, we have found that the physical properties of the alloy begin to be injured seriously if platinum is present to a much greater extent than 7½ per cent., while not sufficient hardness and a low melting point is obtained if much less than 5 per cent. of platinum is employed. Moreover, if a greater amount of platinum than about 7½ per cent. is present, the cost is unnecessarily increased, and the alloy becomes less homogeneous.

The process of manufacturing this alloy does not differ materially from the standard practice in the manufacture of alloys of precious metals. The proper proportions of the three constituents are weighed out and placed in a crucible, and there subjected to a heat sufficient to melt the material. Considerable care, however, must be exercised in order to insure the uniform alloying and mixing of the constituents, and it is preferable to remelt the alloy one or more times after the first melting in order to insure the perfect mixing of the constituent metals. This, however, is standard practice, and further description thereof is unnecessary. The alloy of gold, silver and platinum in the proportions above mentioned has been found to possess practically all the characteristics peculiar to platinum, and furthermore, the advantage of being considerably cheaper than platinum, and somewhat harder than that metal.

We claim:

1. An alloy composed of 67½ to 70 per cent. gold, 25 per cent. silver and from 5 to 7½ per cent. of a hardening metal.

2. An alloy composed of gold, silver and platinum, in approximately the following proportions: gold, 67½ to 70 per cent.; silver, 25 per cent.; platinum, 5 to 7½ per cent.

In witness whereof, we, hereunto subscribe our names this 23rd day of February, 1909.

EDWARD B. CRAFT.
JONATHAN W. HARRIS.

Witnesses:
   D. C. TANNER,
   RUSH F. NEWCOMB.